United States Patent
Chong et al.

(10) Patent No.: US 10,075,854 B2
(45) Date of Patent: Sep. 11, 2018

(54) METHOD FOR MANAGING ACCESS POINTS IN WIFI NETWORK

(71) Applicant: Korea Advanced Institute Of Science and Technology, Daejeon (KR)

(72) Inventors: Song Chong, Daejeon (KR); Jin Woo Shin, Daejeon (KR); Ki Min Lee, Daejeon (KR)

(73) Assignee: Korea Advanced Institute Of Science and Technology, Daejeon (KR)

( * ) Notice: Subject to any disclaimer, the term of this patent is extended or adjusted under 35 U.S.C. 154(b) by 250 days.

(21) Appl. No.: 15/012,994

(22) Filed: Feb. 2, 2016

(65) Prior Publication Data

US 2017/0086203 A1    Mar. 23, 2017

(30) Foreign Application Priority Data

Sep. 22, 2015    (KR) .......................... 10-2015-0133571

(51) Int. Cl.
*H04W 24/02*    (2009.01)
*H04W 16/10*    (2009.01)
*H04W 28/16*    (2009.01)
*H04W 84/12*    (2009.01)
*H04W 88/12*    (2009.01)

(52) U.S. Cl.
CPC ............ *H04W 24/02* (2013.01); *H04W 16/10* (2013.01); *H04W 28/16* (2013.01); *H04W 84/12* (2013.01); *H04W 88/12* (2013.01); *Y02D 70/00* (2018.01); *Y02D 70/122* (2018.01); *Y02D 70/142* (2018.01)

(58) Field of Classification Search
CPC .................................................. H04W 72/082
See application file for complete search history.

(56) References Cited

U.S. PATENT DOCUMENTS

| | | | | |
|---|---|---|---|---|
| 2006/0203743 | A1* | 9/2006 | Quinn | ................. H04L 41/0803 370/254 |
| 2008/0198802 | A1* | 8/2008 | Zhang | ................... H04W 28/08 370/329 |
| 2008/0267079 | A1* | 10/2008 | Mhatre | ............. H04W 74/0808 370/248 |
| 2012/0329471 | A1* | 12/2012 | Barta | .................... H04W 24/02 455/452.1 |
| 2015/0103753 | A1* | 4/2015 | Maddah-Ali | ......... H04W 24/02 370/329 |
| 2015/0351027 | A1* | 12/2015 | Kotecha | ............ H04W 52/0206 370/311 |

FOREIGN PATENT DOCUMENTS

| | | |
|---|---|---|
| KR | 1020120134906 A | 12/2012 |
| KR | 1020130119667 A | 11/2013 |

OTHER PUBLICATIONS

Communication dated Aug. 16, 2016 by the Korean Patent Office in corresponding Application No. 10-2015-0133571.

* cited by examiner

*Primary Examiner* — Huy D Vu
*Assistant Examiner* — Kevin Cunningham
(74) *Attorney, Agent, or Firm* — Sughrue Mion, PLLC

(57) ABSTRACT

Some embodiments of the present disclosure provide a method for managing access points in a Wi-Fi network by using a centralized controller. In some embodiments of the present disclosure, a Wi-Fi access point management method is provided for minimizing interference between Wi-Fi access points in a Wi-Fi network environment, and for reducing excessive power consumption by using a centralized controller to adapt to network conditions, meeting requirements including users' traffic demands.

16 Claims, 5 Drawing Sheets

Input: Queue-weighted matrix $\{w_{i\tilde{v}} : i \in \mathcal{I}, \tilde{v} \in \hat{V}\}$,
Power data $\{p_{\tilde{v}} : \tilde{v} \in \hat{V}\}$,
Interference graph $\hat{G} = (\hat{V}, \hat{E})$.
Output: Control variables $\tilde{x}, \tilde{y}, \tilde{c}$
Initialize: $\tilde{x} \leftarrow \{0\}^{\mathcal{I} \times V}$, $\tilde{y} \leftarrow \{0\}^V$ and $\tilde{c} \leftarrow \{0\}^V$.

---

/* AP Selection & Association step */
A.1. Find an optimal solution of SLP: $(z^*, \mu^*)$
A.2. Filter out $(z^*, \mu^*)$:
   Initialize $z' \leftarrow \{0\}^{\mathcal{I} \times \hat{V}}$, $\mu' \leftarrow \{0\}^{\hat{V}}$
   Select $\tilde{v} = \arg\max_{\tilde{v} \in \hat{V}} w_{i\tilde{v}} z^*_{i\tilde{v}}$ and update
   $$z'_{i\tilde{v}} \leftarrow z^*_{i\tilde{v}}, \quad \mu'_{\tilde{v}} \leftarrow \mu'_{\tilde{v}} + z^*_{i\tilde{v}},$$
   for all $i \in \mathcal{I}$.
A.3. Initialize intermediate parameters:
   $$\hat{V}^{on} \leftarrow \emptyset, \quad \hat{V}^{off} \leftarrow \emptyset, \quad I^{on} \leftarrow \emptyset$$
   $$\pi_{\tilde{v}} \leftarrow \sum_{i \in \mathcal{I}} w_{i\tilde{v}} \frac{\mathbf{1}_{\{z'_{i\tilde{v}} > 0\}}}{\sum_{i \in \mathcal{I}} \mathbf{1}_{\{z'_{i\tilde{v}} > 0\}}} - H p_{\tilde{v}} \mathbf{1}_{\{\mu'_{\tilde{v}} > 0\}}$$
   $$V' \leftarrow \{\tilde{v} \in \hat{V} \mid \mu'_{\tilde{v}} > 0\},$$
   $$E' \leftarrow \{(\tilde{v}, \tilde{u}) \in \hat{E} \mid \tilde{v}, \tilde{u} \in V'\}$$
   where $G' = (V', E') \subset \hat{G}$
A.4. Select an independent set and assign users:
while $V' \neq \emptyset$ do
   Select $(v, c) = \arg\max_{\tilde{u} \in V'} \frac{\pi_{\tilde{u}}}{|\mathcal{N}_{G'}(\tilde{u})| + 1}$ and update
   $$\hat{V}^{on} \leftarrow \hat{V}^{on} \cup \{\tilde{v}\}, \quad \hat{V}^{off} \leftarrow \hat{V}^{off} \cup \mathcal{N}_{\hat{G}}(\tilde{v})$$
   $$V' \leftarrow V' \setminus (\mathcal{N}_{G'}(\tilde{v}) \cup \{\tilde{v}\}), \quad \tilde{y}_v \leftarrow 1, \quad \tilde{c}_v \leftarrow c$$
   If $z'_{i\tilde{v}} > 0$, $\tilde{x}_{iv} \leftarrow 1$ & $I^{on} \leftarrow I^{on} \cup \{i\}$, $\forall i$
end while
/* Remaining User Association step */
for $i \in \mathcal{I} \setminus I^{on}$ do
   R.1. Update a metric for user $i$:
   $$x^+ \leftarrow \tilde{x}, \quad y^+ \leftarrow \tilde{y}, \quad x^+_{iv} \leftarrow 1, \quad y^+_v \leftarrow 1$$
   $$\psi(\tilde{v}) \leftarrow f_{sum}(x^+, y^+) - f_{sum}(\tilde{x}, \tilde{y})$$
   for all $\tilde{v} = (v, c) \in \{\tilde{u} \notin \hat{V}^{off} \mid w_{i\tilde{u}} > 0\}$.
   R.2. Select $(v, c) = \arg\max_{\tilde{u} \in V(i)} \psi(\tilde{u})$ and update
   $$\tilde{x}_{iv} \leftarrow 1, \quad \tilde{y}_v \leftarrow 1, \quad \tilde{c}_v \leftarrow c$$
   If $\tilde{v} \notin \hat{V}^{on}$
   $$\hat{V}^{on} \leftarrow \hat{V}^{on} \cup \{\tilde{v}\}, \hat{V}^{off} \leftarrow \hat{V}^{off} \cup \mathcal{N}_{\hat{G}}(\tilde{v})$$
end for

*FIG. 4*

Input: Queue-weighted matrix $\{w_{i\tilde{v}} : i \in \mathcal{I}, \tilde{v} \in \tilde{V}\}$,
   Power data $\{p_{\tilde{v}} : \tilde{v} \in \tilde{V}\}$,
   Interference graph $\hat{G} = (\hat{V}, \hat{E})$.
Output: Control variables $\tilde{x}, \tilde{y}, \tilde{c}$
Initialize: $\tilde{x} \leftarrow \{0\}^{\mathcal{I} \times V}, \tilde{y} \leftarrow \{0\}^V$ and $\tilde{c} \leftarrow \{0\}^V$.

/* AP Selection step */
S.1. Find an optimal solution of SLP: $(\mu^*)$
S.2. Select an independent set and update:
$$\tilde{V}^{on} \leftarrow \{\tilde{v} \in \tilde{V} \mid \mu^*_{\tilde{v}} > 1/2\},$$
$$\tilde{V}^{off} \leftarrow \{\tilde{u} \in \mathcal{N}_{\hat{G}}(\tilde{v}) \mid \mu^*_{\tilde{v}} > 1/2\},$$
$$I^{un} \leftarrow I \setminus \{i \in \mathcal{I} \mid w_{i\tilde{v}} > 0, \forall \tilde{v} \in \tilde{V}^{on}\},$$
$$S_{\tilde{v}} \leftarrow \{i \in \mathcal{I} \mid w_{i\tilde{v}} > 0\}, \forall \tilde{v}.$$
S.3. Select a set of APs for uncovered users:
while $I^{un} \neq 0$ do
   Select $\tilde{v} = \arg\max_{\tilde{v} \in \tilde{V} \setminus \tilde{V}^{on}} \frac{|S_{\tilde{v}}|}{|\mathcal{N}_{\hat{G}}(\tilde{v})|+1}$ and update
   $$\tilde{V}^{on} \leftarrow \tilde{V}^{on} \cup \{\tilde{v}\}, \quad \tilde{V}^{off} \leftarrow \tilde{V}^{off} \cup \mathcal{N}_{\hat{G}}(\tilde{v})$$
   $$I^{un} \leftarrow I^{un} \setminus S_{\tilde{v}}.$$
end while
/* User Association step */
U.1. Modify queue-weighted achievable rate matrix:
$$w_{i\tilde{v}} \leftarrow 0, \quad \text{for all } i \in \mathcal{I} \text{ and } \tilde{v} \notin \tilde{V}^{on}$$
U.2. Find an optimal solution of SLP: $(z^*)$
U.3. Select $(\tilde{v}, c) = \arg\max_{\tilde{v} \in \tilde{V}^{on}} w_{i\tilde{v}} z^*_{i\tilde{v}}$ and update
$$\tilde{x}_{i\tilde{v}} \leftarrow 1, \tilde{y}_{\tilde{v}} \leftarrow 1, \tilde{c}_{\tilde{v}} \leftarrow c,$$
   for all $i \in \mathcal{I}$.
/* Local Search step */
while $\tilde{V} \setminus (\tilde{V}^{on} \cup \tilde{V}^{off}) \neq 0$ do
   L.1. Generate a candidate solution:
      Add $\tilde{v} \in \tilde{V} \setminus (\tilde{V}^{on} \cup \tilde{V}^{off})$ and update
         $$\tilde{V}^{on} \leftarrow \tilde{V}^{on} \cup \{\tilde{v}\},$$
      Find $(x^{new}, y^{new}, c^{new})$ from $U.1 \sim 3$
   L.2. Update solution:
      If $f_{SMP}(x^{new}, y^{new}) > f_{SMP}(\tilde{x}, \tilde{y})$
         $$\tilde{V}^{off} \leftarrow \tilde{V}^{off} \cup \mathcal{N}_{\hat{G}}(\tilde{v})$$
         $$(\tilde{x}, \tilde{y}, \tilde{c}) \leftarrow (x^{new}, y^{new}, c^{new})$$
      Else
         $$\tilde{V}^{off} \leftarrow \tilde{V}^{off} \cup \{\tilde{v}\}, \tilde{V}^{on} \leftarrow \tilde{V}^{on} \setminus \{\tilde{v}\}$$
end while

*FIG. 5*

METHOD FOR MANAGING ACCESS POINTS IN WIFI NETWORK

CROSS-REFERENCE TO RELATED APPLICATIONS

The present application is based on, and claims priority from, Korean Patent Application Number 10-2015-0133571, filed Sep. 22, 2015, the disclosure of which is hereby incorporated by reference herein in its entirety.

TECHNICAL FIELD

The present disclosure in some embodiments relates to a method for managing access points by using a centralized (wireless LAN) controller in Wi-Fi network.

BACKGROUND

The statements in this section merely provide background information related to the present disclosure and do not necessarily constitute prior art.

Smartphones, tablets and such high-performance mobile devices have fueled the exponential surge of mobile data traffic. As a solution to the phenomenal demand, various companies including telecommunications operators install more and more Wi-Fi access points. Along with their increased amount, the Wi-Fi access points tend to densely concentrate around certain regions with high data traffic in order to cope with concentrated traffic demand.

In a Wi-Fi network environment with concentrated access points, frequent interferences occur between access points. It exacts power consumption that most of the access points constantly operate with maximum power even if they are crowded in a narrow region. There is a need for a Wi-Fi access point management method for minimizing interference between Wi-Fi access points in a Wi-Fi network environment, and for reducing excessive power consumption.

SUMMARY

This work was supported by institute for Information & communications Technology Promotion(IITP) grant funded by the Korea government(MSIP) (B0190-16-2017, Resilient/Fault-Tolerant Autonomic Networking Based on Physicality, Relationship and Service Semantic of IoT Devices). In accordance with some embodiments, the present disclosure provides a method for managing access points in a Wi-Fi network by using a centralized controller, including obtaining information on a data rate for each of the access points, information on a power consumption when the access point is activated, and information on interference relationships between the access points, producing one or more control variables representing an access point to be activated, a channel for use in associating the access point to be activated with a user terminal, and the user terminal to be associated with the access point to be activated, by using obtained informations, and activating part of the access points based on the control variables, and associating activated access points with the user terminal by using the channel.

In some embodiments, the information on the data rate comprises a weight-added data rate generated based on a queue of the user terminal.

In some embodiments, the information on the interference relationships between the access points comprises an interference graph in which each of the access points is a vertex and at least one intervening edge is provided between the access points that are under interfering relationship to each other.

In some embodiments, the control variables include a variable indicating whether or not the access point is activated, a variable indicating the identification of the channel to be used by the access point, and a variable indicating which one of the access points to be activated is associated by the user terminal.

In some embodiments, the producing of the control variables includes obtaining a solution for maximizing a linear objective function which takes, as parameters, a variable representing whether the access point is activated or deactivated and another variable representing which of the access points to be activated is to be associated by the user terminal, producing a first candidate control variable and a second candidate control variable, which represent candidates for the control variables, by using an obtained solution, comparing a first final objective function obtained by substituting the first candidate control variable with a second final objective function obtained by substituting the second candidate control variable, generating the first candidate control variable as the control variable if a value of the final objective function obtained by substituting the first candidate control variable is compared to be greater than the second final objective function obtained by substituting the second candidate control variable, and generating the second candidate control variable as the control variable if the value of the final objective function obtained by substituting the first candidate control variable is compared to be less than the second final objective function obtained by substituting the second candidate control variable.

In some embodiments, the obtaining of the solution for maximizing the linear objective function comprises executing the following equation:

$$\underset{z \in [0,1]^{I \times \hat{V}}, \mu \in [0,1]^{\hat{V}}}{\text{maximize}} \sum_{i \in I} \sum_{\hat{v} \in \hat{V}} w_{i\hat{v}} z_{i\hat{v}} - H \sum_{\hat{v} \in \hat{V}} p_{\hat{v}} \mu_{\hat{v}}$$

wherein i is the user terminal, I is a set of user terminals, $\hat{v}$ is a virtual access point, $\hat{V}$ is a set of virtual access points, $z_{i\hat{v}}$ is $$\frac{x_{i\hat{v}}}{\sum_{i \in I} x_{i\hat{v}}},$$

$x_{i\hat{v}}$ is a variable that indicates whether the user terminal is to associate with a virtual access point, $\mu_{\hat{v}}$ is a variable that indicates whether the virtual access point is to be activated or deativated and that is tolerated to have a value between 0 and 1, $w_{i\hat{v}}$ is $q_i r_{i\hat{v}}$, $q_i$ is a queue of the user terminal, $r_{i\hat{v}}$ is a data rate which the virtual access point can provide to the user terminal, H is a trade-off parameter between power savings and a throughput, and $p_{\hat{v}}$ is a power consumption when the virtual access point is activated.

In some embodiments, the final objective function is expressed by the following equation:

$$\sum_{i \in I} q_i \left( \sum_{v \in V} r_{iv} \frac{x_{iv}}{\sum_{i \in I} x_{iv}} \right) - H \sum_{v \in V} p_v y_v$$

wherein i is the user terminal, I is a set of user terminals, v is the access point, V is a set of access points, $q_i$ is a queue of the user terminal, $r_{i,v}$ is a data rate that the access point can provide to the user terminal, $x_{i,v}$ is a variable that indicates whether the user terminal is to associate with the access point, $y_v$ a variable that indicates whether the access point is to be activated or deativated, H is a trade-off parameter between power savings and a throughput, $p_v$ is a power consumption when the access point is activated.

In some embodiments, the virtual access point identifies a channel for establishing a network association of an access point in the Wi-Fi network.

In some embodiments, the present disclosure provides a method for calculating control variables for managing access points in a Wi-Fi network by using a centralized controller, including obtaining information on a data rate for each of a plurality of virtual access points, information on a power consumption when the virtual access point is activated, and information on interference relationships between the virtual access points, obtaining a solution for maximizing a linear objective function by using an obtained information, filtering an obtained solution and resetting the obtained solution to have a single virtual access point associate with a user terminal, producing a first virtual access point activation reference value for determining the virtual access point to be activated, by using a reset solution, for each of the virtual access points, updating the information on the interference relationships between the virtual access points by using the reset solution, determining virtual access points to be activated among the plurality of the virtual access points by using an updated information on the interference relationships and first virtual access point activation reference value, determining all virtual access points under interfering relationship with the virtual access points to be activated, as virtual access points to be deactivated, determining the virtual access point to be associated with the user terminal among the virtual access points to be activated by using the reset solution, and producing the control variables corresponding to the virtual access points to be activated, to the virtual access points to be deactivated, and to the virtual access point determined to be associated with the user terminal from among the virtual access points to be activated.

In some embodiments, the determining of the virtual access points to be activated includes producing, for each of the plurality of the virtual access points, a second virtual access point activation reference value by dividing the first virtual access point activation reference value by 'the number of all virtual access points under interfering relationships'+1, determining the virtual access point as to be activated when having the second virtual access point activation reference value calculated to be the largest, and determining all the virtual access points under interfering relationships as to be deactivated, further updating the interference graph based on the virtual access point determined to be activated and the virtual access point determined to be deactivated, and activating the access point corresponding to the virtual access point to be activated, and updating a channel of an activated access point.

In some embodiments, the method for calculating the control variables further includes if there is at least one user terminal without the virtual access point determined to be associated with, selecting an arbitrary user terminal from the at least one user terminal, calculating, for each of the plurality of the virtual access points, a virtual access point connection reference value for determining the virtual access point to be associated with the arbitrary user terminal, determining, from among virtual access points available to be associated with the arbitrary user terminal, the virtual access point as to be activated for having the virtual access point activation reference value calculated to be the largest, unless the virtual access point is so determined, determining all virtual access points under interfering relationship with the virtual access points to be activated, as virtual access points to be deactivated, further updating the interference graph based on the virtual access point determined to be activated and the virtual access point determined to be deactivated, and activating the access point corresponding to the virtual access point to be activated, and updating a channel of an activated access point.

In some embodiments, a method for calculating control variables for managing access points in a Wi-Fi network by using a centralized controller, includes obtaining information on a data rate for each of a plurality of virtual access points, information on a power consumption when the virtual access point is activated, and information on interference relationships between the virtual access points, obtaining a solution for maximizing a linear objective function by using an obtained information, using an obtained solution for determining the virtual access point to be activated, determining all virtual access points under interfering relationship with the virtual access point to be activated, as virtual access points to be deactivated, and determining a user terminal that cannot be associated with the virtual access point to be activated, further determining the virtual access point to be activated based on a power consumption among the virtual access points other than the virtual access points to be deactivated and on the number of user terminals available for association from among user terminals that cannot be associated with the virtual access point to be activated, further determining all virtual access points under interfering relationship with the virtual access point further determined to be activated, as virtual access points to be deactivated, updating the user terminals that cannot be associated with the virtual access point to be activated, by reflecting the virtual access point further determined to be activated and the virtual access point further determined to be deactivated, modifying the information on the data rate by reflecting the virtual access point determined to be activated, obtaining a further solution for maximizing the linear objective function by using a modified information on the data rate, and setting a further obtained solution to an adjusted solution, determining, from among the virtual access points to be activated, the virtual access point to be associated with the user terminal, by using the adjusted solution, and calculating the control variables corresponding to the virtual access points to be activated, to the virtual access points to be deactivated, and to the virtual access point determined to be associated with the user terminal from among the virtual access points to be activated.

In some embodiments, the method for calculating the control variables further includes determining the independent virtual access point as a virtual access point to be activated if there is an independent virtual access point that belongs neither to the virtual access points to be activated nor to the virtual access points to be deactivated, further obtaining a solution for maximizing the linear objective function by reflecting the independent virtual access point determined to be the virtual access point, and setting the solution further obtained to a readjusted solution, setting and generating the readjusted solution as the control variable if a value of a final objective function obtained by substituting the readjusted solution is greater than a second final objective function obtained by substituting the adjusted solution, and determining the virtual access point that corresponds to the readjusted solution, as the virtual access point to be deactivated if the value of the final objective function obtained by substituting the readjusted solution is less than the second final objective function obtained by substituting the adjusted solution.

In some embodiments, the calculating of the control variables for managing the access points is repeatedly performed until there remains no more of the virtual access points, that belongs neither to the virtual access points to be activated nor to the virtual access points to be deactivated.

In some embodiments, a centralized controller for managing access points, includes an input unit, a control variable calculation unit and a controlling unit. The input unit is configured to obtain information on a data rate for each of the access points included in a Wi-Fi network, information on a power consumption when the access point is activated, and information on interference relationships between the access points. The control variable calculation unit is configured to produce one or more control variables representing an access point to be activated, a channel for use in associating the access point to be activated with a user terminal, and the user terminal to be associated with the access point to be activated, by using obtained informations. And the controlling unit is configured to activate a part of the access points based on the control variables, and associating activated access points with the user terminal by using the channel.

BRIEF DESCRIPTION OF DRAWINGS

FIG. 4 is a diagram of an algorithm of a method for calculating control variables for managing access points according to at least one embodiment of the present disclosure.

FIG. 5 is a diagram of an algorithm of a method for calculating control variables for managing access points according to another embodiment of the present disclosure.

DETAILED DESCRIPTION

Figure 1:
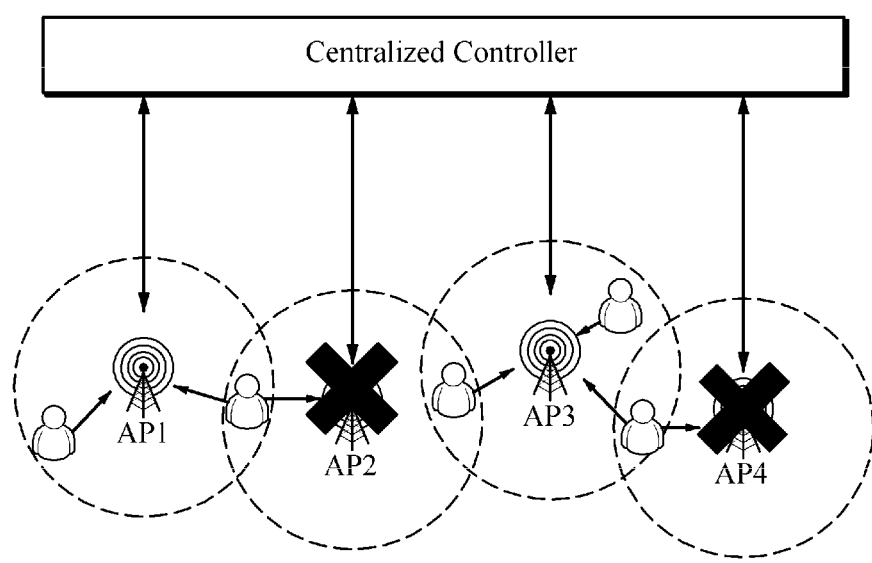
FIG. 1 is a conceptual diagram of a method for managing access points according to at least one embodiment of the present disclosure.

Hereinafter, some embodiments of the present disclosure will be described in detail through the illustrative drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, i, ii, (a) and (b) are used. These are solely for the purpose of differentiating one component from another, and one of ordinary skill would understand the terms are not to imply or suggest the substances, the order or sequence of the components. Throughout this specification, when a part "includes" or "comprises" a component, unless there is a particular description contrary thereto, the part can further include other components, not excluding the other components. Further, the terms such as "unit", "module", etc. disclosed in the specification mean units for processing at least one function or operation, which may be implemented by hardware, software, or a combination thereof.

Detailed description disclosed below in conjunction with the accompanying drawings is intended to describe exemplary embodiments of the present disclosure, and not to shows the only embodiments in which the present disclosure may be implemented.

The present disclosure in some embodiments provides a method for Wi-Fi access point management by using a centralized controller according to network conditions such as user traffic demands, to achieve minimized interference between the Wi-Fi access points and reduced power consumption inherent in the prior art.

FIG. 1 is a conceptual diagram of a method for managing access points according to at least one embodiment of the present disclosure.

Referring to FIG. 1, the management method for wireless LAN or Wi-Fi access points (APs) according to some embodiments of the present disclosure is mainly performed by a centralized controller in a Wi-Fi network environment. To reduce interference between APs and to prevent unnecessary power consumption, the centralized controller determines such factors as the APs to activate, the channels to operate, and the user terminals to associate with the activated APs. The centralized controller can be implemented in, for example, a controller in a Software Defined Network (SDN). Intelligent network functions are concentrated in the centralized controller so that it generally administers the entire network which may be considered a single logical switch. A programmed control of the abstract network obviates the need for a manual management of several tens of thousand lines of configuration information that is distributed across thousands of network devices. Along with the network abstraction, the access point management using such a centralized controller provides a series of APIs (Application Programming Interfaces) between the SDN control layers and the application layers. Common network services can be implemented with the API, and a variety of forms of managements are made available, e.g., for management-relevant routing, access control, traffic engineering, QoS (Quality of Service) control, power control and so on.

The user terminal according to one or more embodiments refers to a user terminal, including a smart phone, tablet PC (personal computer), PDA (personal digital assistant), game console, PMP (portable multimedia player), PSP (PlayStation Portable), wireless communication terminal, smartphone, TV, media player, and the like. The user terminal according to one or more embodiments may be various apparatuses each including (i) a communication apparatus such as a communication modem and the like for performing communications with various types of devices or wired/wireless communication networks, (ii) a memory for storing various programs and data, and (iii) a microprocessor for executing a program so as to perform calculations and control, and the like. According to at least one embodiment, the memory includes a computer-readable recording/storage medium such as a random access memory (RAM), a read only memory (ROM), a flash memory, an optical disk, a magnetic disk, a solid-state disk (SSD), and the like. According to at least one embodiment, the microprocessor may be programmed for performing one or more of operations and/or functionality described herein. According to at least one embodiment, the microprocessor is implemented, in whole or in part, by specifically configured hardware (e.g., by one or more application specific integrated circuits or ASICs).

Figure 2:
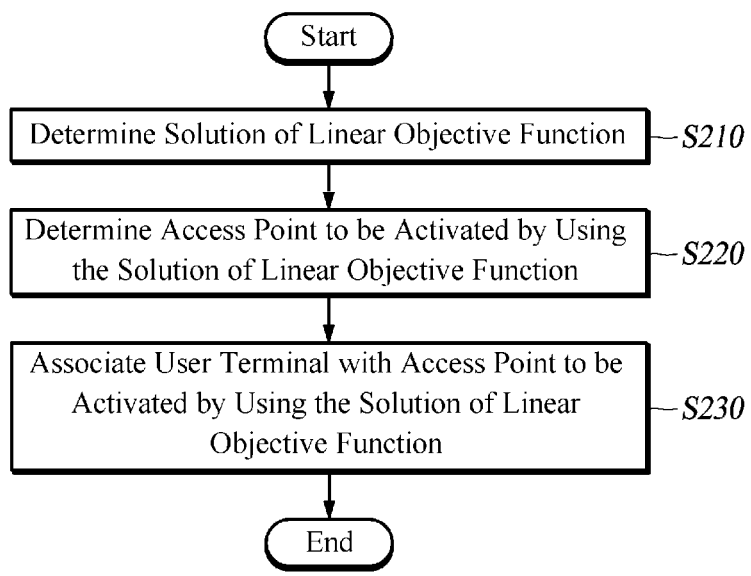
FIG. 2 is a flowchart of a method for managing access points according to at least one embodiment of the present disclosure.

FIG. 2 is a schematic flowchart of a method for managing access points according to at least one embodiment of the present disclosure.

Referring to FIG. 2, the method for managing Wi-Fi access points according to some embodiments largely includes three processes. Step S210 is to determine a solution of the linear objective function for minimizing interference between Wi-Fi APs and thereby maximizing an energy efficiency. Then, Step S220 determines an AP to be activated from among a plurality of access points that are employed in a Wi-Fi network, by using the solution of the linear objective function. Finally, Step S230 determines a user terminal and associates it with an activated AP, by using the solution of the linear objective function.

The following describes the process for obtaining a linear objective function to minimize the interference between wireless LAN APs according to some embodiments and to achieve maximum power efficiency.

For the solution of the present disclosure, a problem may be defined with a Mixed Integer Programming as can be expressed by Equation 1. Hereinafter, a time symbol (t) of each variable will be omitted for convenience of explanation.

Equation 1

$$\underset{x\in[0,1]^{I\times V}, y\in[0,1]^{V}, c\in C^{V}}{\text{maximize}} \; f_{SMIP}(x, y)$$

subject to $$1_{[c_v=c_u]} y_v y_u = 0, \; \forall u \in \mathcal{N}_G(v) \; \& \; \forall v \in V, \quad (1)$$

$$x_{iv} \le y_v, \; \forall v \in V \; \& \; \forall i \in I, \quad (2)$$

$$\sum_{v \in V} x_{iv} = 1, \; \forall i \in I, \quad (3)$$

In the above, $$f_{SMIP}(x, y) := \sum_{i \in I} q_i \left( \sum_{v \in V} r_{iv} \frac{x_{iv}}{\sum_{i \in I} x_{iv}} \right) - H \sum_{v \in V} p_v y_v$$

In Equation 1, the respective symbols are defined as Table 1.

TABLE 1

| I | Set of user terminals 'i' | V | Set of access points 'v' |
|---|---|---|---|
| C | Set of non-overlapped channels 'c' | $y_v(t)$ | Variable indicating whether access point 'v' is activated or deactivated at time t |

TABLE 1-continued

| $c_v(t)$ | Variable indicating which channel to use when access point 'v' is activated at time t | $x_{iv}(t)$ | Variable indicating whether or not user terminal 'i' is associated with access point 'v' at time t |
|---|---|---|---|
| $q_i(t)$ | Queue of user terminal 'i' at time t | $r_{iv}(t)$ | Rate of data that user terminal 'i' can receive from access point 'v' at time t |
| $w_{iv}(t)$ | $q_i(t) r_{iv}(t)$ | $p_v$ | Power consumption when access point 'v' is activated |
| $z_{iv}(t)$ | $\dfrac{x_{iv}(t)}{\sum_{i \in U} x_{iv}(t)}$ Time assigned when user terminal 'i' is associated with access point 'v' | G | Graph of interference between access points |
| $N_G(v)$ | Set of all access points in interference relationship with access point 'v' on the interference graph (G) | H | Trade off parameter between energy savings and throughput |

Equation 1 is a problem to find x, y and c that maximize function $f_{SMIP}$ while satisfying conditions (1) to (3). The function of Equation 1 is to obtain the final solution as intended by the embodiments of the present disclosure, and it is so referred to as the Ultimate Objective Function. Condition (1) is that two APs under interference relationship cannot become active (On) at the same time. Condition (2) is that only activated APs can have a user terminal associated thereto. Condition (3) is that all the user terminals that desire services must be able to associate with an AP and that a single user terminal needs to associate to only one AP. An interference graph between APs is defined by G=(V,E). The interference graph has a plurality of APs, each being a vertex, and has an edge between the APs under the interference relationships among the plurality of APs. Here, V refers to a set of APs, and E is a set of edges which are defined as being possessed by two APs when they are under interfering relationship.

Values $q_i(t)$ and $r_{iv}(t)$ are updated every time slot and are assumed to be knowable. This is because embodiments of the present disclosure utilize the centralized controller for managing APs to constantly monitor the AP traffic and users' transmission of their Wi-Fi scan results to the centralized controller makes Wi-Fi SSID (Service Set Identifier) and RSSI (Received Signal Strength Indicator) available to the centralized controller for use in estimating the values of $q_i(t)$ and $r_{iv}(t)$.

In objective function $f_{SMIP}$ of Equation 1, the left term $$\sum_{i \in I} q_i \left( \sum_{v \in V} r_{iv} \frac{x_{iv}}{\sum_{i \in I} x_{iv}} \right)$$

is for finding the solution for maximizing user terminal's queue $q_i(t)$ and data rate $r_{iv}(t)$. The left term is to optimize the throughput of the Wi-Fi network. The right term, $-\Sigma_{v \in V} p_v y_v(t)$ means that more power is consumed as the number of activated APs increase. The right term is given minus sign, in order to indicate minimizing the power consumption by activating a smallest possible number of APs. The left term increases in proportion to the increasing number of APs, and has a trade-off relationship with the right term. This relationship is reflected by trade-off parameter H. With H, the priority can be determined between the two terms of the objective function.

To collectively consider the problem of selecting the AP to activate and selecting the channel to use, a concept of virtual AP can be defined. A virtual AP $\hat{v}=(v,c)$ is a concept that refers to channel 'c' to be used in association between one AP 'v' and the network, which, when applied to Equation 1, can be modified as Equation 2.

Equation 2

$$\underset{x\in[0,1]^{I\times\hat{V}}, y\in\{0,1\}^{\hat{V}}}{\text{maximize}} \quad f_{SMIP}(x, y)$$

subject to $$y_{\hat{v}} + y_{\hat{u}} \leq 1, \forall \hat{u} \in \mathcal{N}_{\hat{G}}(\hat{v}) \ \& \ \forall \hat{v} \in \hat{V}, \quad (4)$$

$$x_{i\hat{v}} \leq y_{\hat{v}}, \forall \hat{v} \in \hat{V} \ \& \ \forall i \in I, \quad (5)$$

$$\sum_{\hat{v}\in\hat{V}} x_{i\hat{v}} = 1, \forall i \in I, \quad (6)$$

In the above, $$f_{SMIP}(x, y) := \sum_{i\in I}\sum_{\hat{v}\in\hat{V}} q_i r_{i\hat{v}} \frac{x_{i\hat{v}}}{\sum_{i\in I} x_{i\hat{v}}} - H\sum_{\hat{v}\in\hat{V}} p_{\hat{v}} y_{\hat{v}}$$

The meanings of the respective symbols in Equation 2 are presented in Table 2.

TABLE 2

| $\hat{V}$ | Set of virtual access points (V × C) | $y_{\hat{v}}$ | Variable indicating whether virtual access point $\hat{v} = (v, c)$ is activated or deactivated |
|---|---|---|---|
| $x_{i\hat{v}}$ | Variable indicating whether or not user terminal 'i' is associated with virtual access point $\hat{v}$ | $\hat{G}$ | Graph of interference between virtual access points |

Power consumption $p_{\hat{v}}$ of virtual AP $\hat{v}$ when activated is set to be equal to power consumption $p_v$ of physical AP 'v' when activated. Data rate $r_{i\hat{v}}$ of a virtual AP is also set to be equal to data rate $r_{iv}$.

Interference graph $\hat{G}=(\hat{V},\hat{E})$ presents an interference defined between two virtual APs provided that the two virtual APs either (i) correspond to physical APs which are equal to each other or (ii) have their corresponding physical APs under interference relationship and corresponding also to the same channel.

With the defined variables as in Table 2, Equation 2 becomes equivalent to Equation 1. The problem presented by Equation 2 may take account of the AP and the channel en bloc by defining the concept of virtual AP. For example, that $y_{\hat{v}}$ equals 1 represents that actual AP 'v' operates by using channel 'c', and that $y_{\hat{v}}$ equals 0 represents that actual AP 'v' is disabled. That $x_{i\hat{v}}$ equals 1 means that user terminal T associates with the actual AP 'v'. Therefore, reformulating condition (1) of Equation 1 which is the conditions related to the interference into a condition (4) of Equation 2 in solving a relevant problem makes it sufficient to simply determine whether or not the virtual AP is activated in order to obtain two variables, i.e., whether or not the actual AP is activated and the selection of a channel.

However, in order to fast obtain an optimal solution of the Equation 2 problem, there is a need for converting the problem into that of the linear model. The conversion into the linear model problem yields Equation 3. Hereinafter, the objective function as converted into the linear model problem of Equation 3 is referred to as a linear objective function.

Equation 3

$$\underset{z\in[0,1]^{I\times\hat{V}},\mu\in[0,1]^{\hat{V}}}{\text{maximize}} \sum_{i\in I}\sum_{\hat{v}\in\hat{V}} w_{i\hat{v}} z_{i\hat{v}} - H\sum_{\hat{v}\in\hat{V}} p_{\hat{v}} \mu_{\hat{v}}$$

subject to $$\mu_{\hat{v}} + \mu_{\hat{u}} \leq 1, \forall \hat{u} \in \mathcal{N}_{\hat{G}}(\hat{v}), \forall \hat{v} \in \hat{V}, \quad (7)$$

$$\sum_{i\in I} z_{i\hat{v}} \leq \mu_{\hat{v}}, \forall \hat{v} \in \hat{V}, \quad (8)$$

$$\frac{1}{\Omega} \leq \sum_{\hat{v}\in\hat{V}} z_{i\hat{v}} \leq 1, \forall i \in I \quad (9)$$

$$\sum_{\hat{v}: i\in S_{\hat{v}}} \mu_{\hat{v}} \geq 1, \forall i \in I. \quad (10)$$

The meanings of the respective symbols in Equation 3 are presented in Table 3.

TABLE 3

| $\mu_{\hat{v}}$ | Variable tolerating $y_{\hat{v}}$ to have a value between 0 and 1 | $z_{i\hat{v}}$ | $\dfrac{x_{i\hat{v}}}{\Sigma_{i\in I} x_{i\hat{v}}}$ |
|---|---|---|---|
| $S_{\hat{v}}$ | Set of user terminals that can associate with virtual access point $\hat{v}$ | $\Omega$ | Time assigned when user terminal 'i' is associated with access point $\hat{v}$ Maximum number of terminals that a single access point can serve |

Equation 3 can be derived by converting the binary variables in Equation 2 into continuous variables between 0 and 1. Condition (7) of Equation 3 refers to an interference condition, and a condition (8) can be obtained by converting condition (5) of Equation 2. Condition (6) of Equation 2 cannot be expressed to be entirely linear, and thus Equation 3 introduces two additional conditions of a condition (9) and a condition (10) for expressing that every user terminal must always associate with an AP.

The centralized AP management method for use with Wi-Fi network in some embodiments of the present disclosure obtains, at each time slot, the solution for the linear objective function expressed by Equation 3. However, the linear objective function of Equation 3, after its linear conversion, does not meet all of the constraints set by Equation 1. Therefore, it requires a process of using the solution of the linear objective function to derive the solution of the final objective function of Equation 1.

Figure 3:
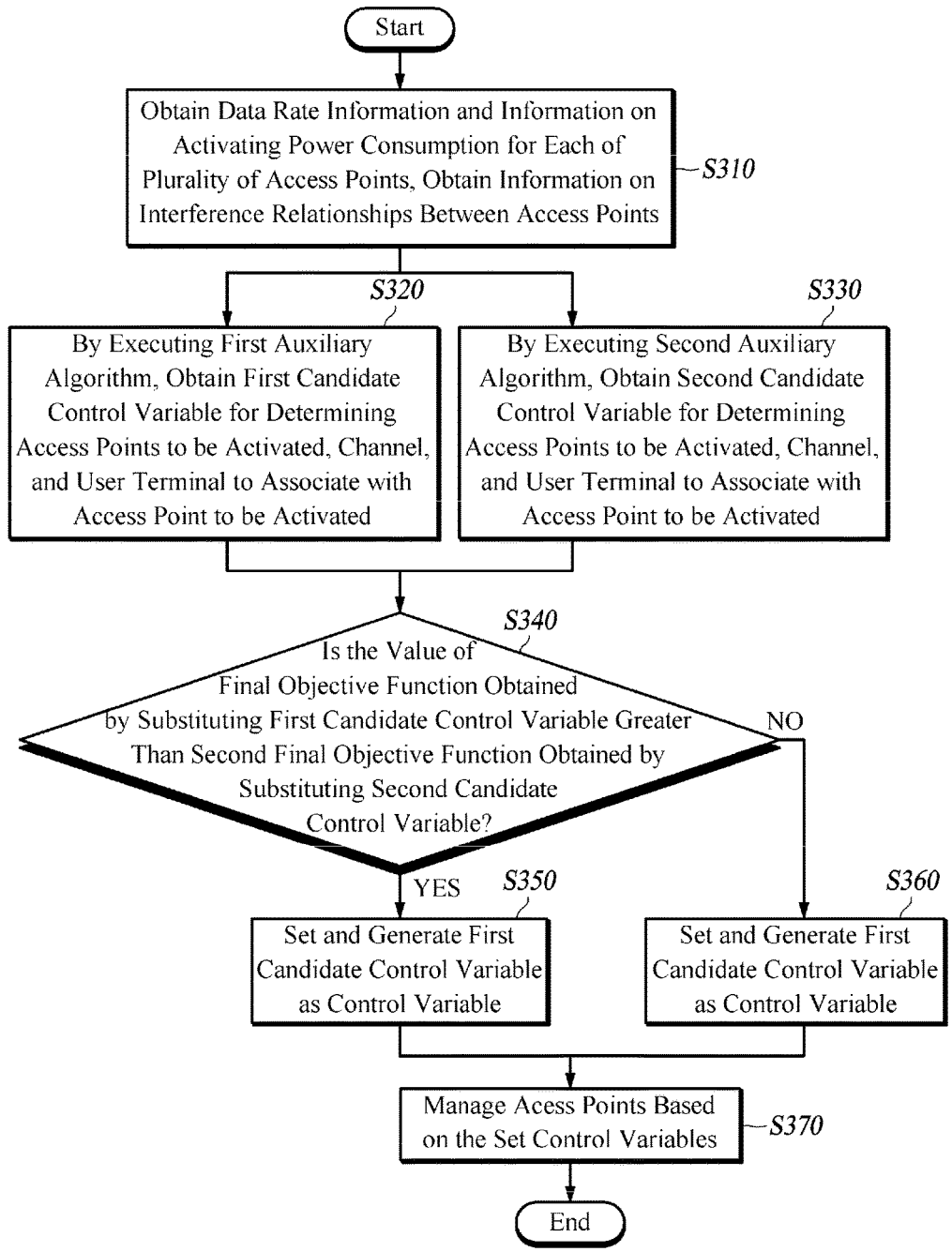
FIG. 3 is a flowchart of a method for managing access points according to at least one embodiment of the present disclosure.

FIG. 3 is a flowchart of a method for managing APs according to at least one embodiment of the present disclosure.

The AP management method as illustrated in FIG. 3 may be freshly performed for each time slot.

Referring to FIG. 3, according to some embodiments of the present disclosure, Step S310 is performed by a centralized controller for obtaining data rate information and information on activating power consumption for each of the plurality of APs employed in a Wi-Fi network, and for obtaining information on the interference between the multiple APs.

The data rate information that an AP can provide for a user terminal refers to a weight added data rate based on the queues of the user terminal. For the purpose of illustration, this is referred to as queue-weighted data rate. Here, the queue-weighted data rate may be equal to user terminal queue $q_i$ multiplied by data rate $r_{iv}$ that the AP can provide to the user terminal. Virtual AP's data rate $r_{i\hat{v}}$ is set to be the same as AP's data rate $r_{iv}$, and thus the virtual AP and the AP have the same queue-weighted data rate.

Power consumption at the time of activating the AP is set equal to the power consumed at the time of activating the virtual AP, as described above.

The information on the interference between multiple APs may be the interference graph wherein each of the multiple APs is a vertex and the APs under interfering relationship among the multiple APs have an intervening edge therebetween.

Some embodiments may acquire the same information as obtained in step S310 by an externally generated input or through an internal operation of the centralized controller.

Through steps S320 to S370, the centralized controller determines (i) APs to activate, (ii) a channel for establishing an association between the AP to activate and user terminals and (iii) control variables representing the user terminal to associate with the AP to activate. The control variables may include a variable indicating whether or not an AP is activated, a variable indicating the identification of the channel to be used the AP, and a variable indicating which one of the APs to be activated is associated by the user terminal.

Referring to FIG. 3, prior to finally calculating the control variables, the centralized controller according to some embodiments of the present disclosure obtains a first candidate control variable and a second candidate control variable by using a first auxiliary algorithm and a second auxiliary algorithm (S320 and S330). The first and second auxiliary algorithms are adapted to utilize obtained inputs for obtaining the solution of the linear objective function of the above-described Equation 3, and undergoing a series of processes to obtain, from the solution of the linear objective function, the solution of the final objective function, i.e. the control variables. The first and second auxiliary algorithms may be performed in parallel or performed sequentially according to the embodiments.

To select a more appropriate solution between the first and second candidate control variables, a determination is made for whether the value of the final objective function obtained by substituting the first candidate control variable is greater than the final objective function obtained by substituting the second candidate control variable (S340).

In compliance with this process of obtaining the solution that maximizes the final objective function value, if the value of the final objective function obtained by substituting the first candidate control variable is determined to be greater than the second final objective function obtained by substituting the second candidate control variable, the first candidate control variable is set and generated as the control variable (S350). Or else, the second candidate control variable is set and generated as the control variable (S360).

The centralized controller now manages the APs based on the finally set control variable (S370).

FIG. 4 is a diagram of an algorithm of a method for calculating control variables for managing APs according to some embodiments.

FIG. 5 is a diagram of an algorithm of a method for calculating control variables for managing APs according to another embodiment of the present disclosure.

Referring to FIGS. 4 an 5, detailed descriptions will be provided on the aforementioned first and second auxiliary algorithms.

Referring to FIG. 4, the first auxiliary algorithm utilizes an earlier obtained input to calculate a solution $(z^*,\mu^*)$ of a linear objective function (Process A.1). The process of obtaining the solution of the linear objective function is a process of obtaining a solution that maximizes the value of the linear objective function of Equation 3. Of solutions $(z^*,\mu^*)$ that are obtained, a solution is selected that has the largest $z^*$ value and the selected solution is filtered and assigned as $z', \mu'$ (Process A.2). This is because a single user terminal can associate with a single virtual AP.

With $\hat{V}^{on}$ defined as a set of virtual APs to be finally activated, $\hat{V}^{off}$ a set of virtual APs to be deactivated, and $I^{on}$ a set of user terminals up for decision as to their association with a certain AP, a process A.3 initializes the respective sets to an empty set. Then, $z^*,\mu^*$, that has been set in process A.2, is used to calculate a first AP activation reference value $\pi_{\hat{v}}$ for respective virtual APs (Process A.3). The first AP activation reference value $\pi_{\hat{v}}$ is represented by Equation 4.

$$\sum_{i \in I} w_{i\hat{v}} \frac{1_{\{z'_{i\hat{v}}>0\}}}{\sum_{i \in I} 1_{\{z'_{i\hat{v}}>0\}}} - H_{P_{\hat{v}}} 1_{\{\mu'_{\hat{v}}>0\}} \qquad \text{Equation 4}$$

In addition, the graph $\hat{G}=(\hat{V},\hat{E})$ of interference between the virtual APs is conditioned $\mu'>0$, and then updated to $G'=(V',E')$ (Process A.3). This process is to address possible selection by process A.2 of virtual APs under interfering relationship.

A process A.4 calculates a value obtained by dividing the first AP activation reference value $\pi_{\hat{v}}$ by 'the number of virtual APs under interfering relationships with relevant virtual APs' (hereinafter, called degree)+1. The largest calculated virtual AP is selected for each iteration of process A.4. This accounts for losses due to the deactivated virtual APs because, as mentioned above, selecting one virtual AP involves deactivating all virtual APs under interfering relationship. The selected virtual AP is added to set $\hat{V}^{on}$, and all virtual APs under interfering relationship with the selected virtual AP are added to set $\hat{V}^{off}$. Subsequently, this is reflected by updating the interference graph G'. Then, the virtual access points that have been added to $\hat{V}^{on}$ and $\hat{V}^{off}$ will be no more taken into account when selecting the next AP. For example, of the virtual APs that are not determined whether to activate or not, those under interfering relationship with the virtual APs added to $\hat{V}^{off}$ have their interference relationship changed due to the virtual APs that are deactivated. The updating of the interference graph G' is to reflect such change in the interference relationship. After the interference graph G' is updated, the physical AP corresponding to the selected virtual AP is activated ($\bar{y}_v$=1), and the channel of the selected virtual AP is updated ($\bar{c}_v$=c). This is followed by associating all user terminals that are $z_{i\hat{v}}'>0$ with the activated virtual AP ($\bar{x}_{i\hat{v}}$=1), and adding the same user terminals to $I^{on}$. Process A.4 is performed repeatedly until V' becomes the empty set.

The following addresses the other user terminals which underwent Processes A.1 through A.4 and still have no AP determined to associate with, to complete the determination of their association.

The first auxiliary algorithm according to embodiments of the present disclosure further includes Process R.1 and Process R.2.

According to the first auxiliary algorithm of the embodiments, Process R.1 arbitrarily selects a user terminal having no AP yet to associate with, and calculates a virtual AP association reference value $\psi$ for virtual APs to which the selected user terminal can associate with (Process R.1). Here, virtual access point association reference value $\psi$ is defined by the objective function value $f_{SMIP}(x^+,y^+) - f_{SMIP}(\overline{x},\overline{y})$ when the user terminal adds the solution for selecting the virtual AP to a previously determined solution.

A virtual AP having the largest value is selected from the calculated user terminal association reference function values $\psi$, to finally calculate the first candidate control variables (Process R.2).

Referring to FIG. 5, a second auxiliary algorithm according to an embodiment of the present disclosure, first, to obtain the solution of the linear objective function (Process S.1). A process of obtaining a solution of a linear objective function is as described above. Using the solution obtained, a set of APs which are $\mu^* > \frac{1}{2}$ is set to $\hat{V}^{on}$, the set of all virtual APs under interfering relationship with the virtual APs which are $\mu^* > \frac{1}{2}$ is set to $\hat{V}^{off}$, and the set of all user terminals unable to associate with the selected virtual AP to be in $\hat{V}^{on}$ is set to $I^{un}$ (Process S.2). This is to select the virtual APs which are not under interfering relationship.

Process S.3 determines such virtual APs to be additionally activated besides the virtual APs determined to be in $\hat{V}^{on}$ in Process S.2. This ensures positive association of all of the user terminals that exist in the Wi-Fi network environment to the access point. In order to select the virtual APs to be further activated, a calculation as in Equation 5 is performed on all virtual APs that do not correspond to $\hat{V}^{on}$ and $\hat{V}^{off}$.

$$p_{\hat{v}}/|S_{\hat{v}} \cap I^{un}| \qquad \text{Equation 5}$$

In Equation 5, $p_{\hat{v}}$ denotes a power consumption when a virtual AP $\hat{v}$ is activated, and $S_{\hat{v}}$ denotes the number of user terminals that can associate with the virtual AP $\hat{v}$.

A virtual AP having the largest calculated value of Equation 5 is selected out of all the virtual APs that correspond to neither $\hat{V}^{on}$ nor $\hat{V}^{off}$. Thereafter, the selected virtual AP is added to $\hat{V}^{on}$, all virtual APs under interfering relationship with the added virtual AP is added to $\hat{V}^{off}$, and $I^{un}$ is updated (Process S.3). Process S.3 is repeatedly executed as long as $I^{un}$ is the empty set.

Subsequently, a description will be given of a process for associating the user terminal with the activated AP (Process U.1 to Process U.3). First, to account only for the virtual APs corresponding to $\hat{V}^{on}$, queue-weighted data rate $w_{i\hat{v}}$ of all virtual APs other than $\hat{V}^{on}$ is adjusted to 0 (Process U.1). Using the queue-weighted data rate $w_{i\hat{v}}$, solution $Z^*$ of the linear objective function is recalculated, and the recalculation is set as an adjusted solution (Process U.2). With the adjusted solution of the linear objective function, the value $w_{i\hat{v}} z_{i\hat{v}}^*$ is calculated for every virtual AP, and the respective user terminals are associated with the virtual AP having the largest $w_{i\hat{v}} z_{i\hat{v}}^*$ value (Process U.3). The centralized controller according to some embodiments calculates second candidate control variables $(\overline{x}, \overline{y}, \overline{c})$ corresponding to the finally determined virtual AP to be activated, to the virtual APs to be deactivated, and to the virtual AP determined to be associated with the user terminal from among the virtual APs to be activated.

Referring to FIG. 5, the second auxiliary algorithm according to some embodiments further includes Process L.1 and Process L.2. These processes are for a better solution than the second candidate control variables calculated through Processes S.1 to S.3 and Processes U.1 to U.3.

If the execution of Process S.1 to Process S.3 results in a virtual AP remaining that corresponds to neither $\hat{V}^{on}$ nor $\hat{V}^{off}$, a local search algorithm may be used to obtain an optimal solution. First, a virtual AP, corresponding to neither $\hat{V}^{on}$ nor $\hat{V}^{off}$, is selected and added to $\hat{V}^{on}$. Thereafter, Process U.1 to Process U.3 are run to calculate new second candidate control variables $(x^{new}, y^{new}, c^{new})$, and to further adjust or re-modify the previously calculated second candidate control variables to newer second candidate control variables (Process L.1).

If the objective function $f_{SMIP}(x^{new}, y^{new})$ obtained by substituting the re-modified second candidate control variables is greater than the objective function $f_{SMIP}(\overline{x},\overline{y})$ obtained by substituting the previously calculated second candidate control variables, the re-modified second candidate control variables are set as the final second candidate control variables, and all virtual APs under interfering relationship with the newly selected virtual APs are added to $\hat{V}^{off}$. In the opposite case where the objective function $f_{SMIP}(x^{new}, y^{new})$ obtained by substituting the newly calculated second candidate control variables is less than the objective function $f_{SMIP}(\overline{x},\overline{y})$ obtained by substituting the previously calculated second candidate control variables, all virtual APs under interfering relationship with previously selected virtual APs are added to $\hat{V}^{off}$ (Process L.2). Here, the previously selected virtual AP refers to a virtual AP that is selected based on the previously calculated second candidate control variables. Process L.1 and Process L.2 are repeated until there remains no more virtual AP that corresponds to neither $\hat{V}^{on}$ nor $\hat{V}^{off}$.

The steps illustrated in FIGS. 2 and 3 are described to be sequentially performed as a mere example for describing the technical idea of some embodiments, although one of ordinary skill in the pertinent art would appreciate that various modifications, additions and substitutions are possible by performing the sequences shown in FIGS. 2 and 3 in a different order or at least one of the steps in parallel without departing from the idea and scope of the embodiments, and hence the example shown in FIGS. 2 and 3 is not limited to the chronological order.

The respective steps shown in FIGS. 2 and 3 can be implemented as a computer program, and can be recorded on a computer-readable medium. The computer-readable recording medium includes any type of recording device on which data that can be read by a computer system are recordable. Examples of the computer-readable recording medium include magnetic storage medium such as a ROM, a floppy disk, a hard disk, optically readable medium such as a CD-ROM, DVD and the like, and also include one implemented in the form of carrier wave (e.g., transmission through the Internet). Further, the computer-readable recording medium can be distributed in computer systems connected via a network, and computer-readable codes can be stored and executed in a distributed mode.

As explained above, according to some embodiments of the present disclosure, in a Wi-Fi network environment where the access points are congested, interference is minimized between the Wi-Fi access points, and the power efficiency of the entire network is increased.

Additionally, according to some embodiments of the present disclosure, an effect is provided that users associated with a specific access point can be transferred seamlessly to other access points.

Although exemplary embodiments of the present disclosure have been described for illustrative purposes, those skilled in the art will appreciate that various modifications, additions and substitutions are possible, without departing from the idea and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. A method for managing access points in a Wi-Fi network by using a centralized controller, the method comprising:
    obtaining information on a data rate for each of the access points, information on a power consumption when the access point is activated, and information on interference relationships between the access points;
    producing one or more control variables representing an access point to be activated, a channel for use in associating the access point to be activated with a user terminal, and the user terminal to be associated with the access point to be activated, by using the obtained information; and
    activating some of the access points based on the control variables, and associating activated access points with the user terminal by using the channel,
    wherein the producing the control variables comprises:
    obtaining a solution for maximizing a linear objective function which takes, as parameters, a variable representing whether the access point is activated or deactivated and another variable representing which of the access points to be activated is to be associated by the user terminal;
    producing a first candidate control variable and a second candidate control variable which, represent candidates for the control variables, by using the obtained solution;
    comparing a final objective function obtained by substituting the first candidate control variable with a second final objective function obtained by substituting the second candidate control variable;
    generating the first candidate control variable as the control variable if a value of the final objective function obtained by substituting the first candidate control variable is compared to be greater than the second final objective function obtained by substituting the second candidate control variable; and
    generating the second candidate control variable as the control variable if the value of the final objective function obtained by substituting the first candidate control variable is compared to be less than the second final objective function obtained by substituting the second candidate control variable.

2. The method of claim 1, wherein the information on the data rate comprises a weight-added data rate generated based on a queue of the user terminal.

3. The method of claim 1, wherein the information on the interference relationships between the access points comprises an interference graph in which each of the access points is a vertex and at least one intervening edge is provided between the access points that are under interfering relationship to each other.

4. The method of claim 1, wherein the control variables comprise a variable indicating whether or not the access point is activated, a variable indicating an identification of the channel to be used by the access point, and a variable indicating which one of the access points to be activated is associated by the user terminal.

5. The method of claim 1, wherein the obtaining the solution for maximizing the linear objective function comprises executing the following equation:

$$\underset{z\in[0,1]^{I\times\hat{V}},\mu\in[0,1]^{\hat{V}}}{\text{maximize}} \sum_{i\in I}\sum_{\hat{v}\in\hat{V}} w_{i\hat{v}} z_{i\hat{v}} - H\sum_{\hat{v}\in\hat{V}} p_{\hat{v}}\mu_{\hat{v}}$$

wherein i is the user terminal, I is a set of user terminals, $\hat{v}$ is a virtual access point, $\hat{V}$ is a set of virtual access points, $z_{i\hat{v}}$ is $$\frac{x_{i\hat{v}}}{\sum_{i\in I} x_{i\hat{v}}},$$

$x_{i\hat{v}}$ is a variable that indicates whether the user terminal is to associate with a virtual access point, $\mu_{\hat{v}}$ is a variable that indicates whether the virtual access point is to be activated or deactivated and that is tolerated to have a value between 0 and 1, $w_{i\hat{v}}$ is $q_i \cdot r_{i\hat{v}}$, $q_i$ is a queue of the user terminal, $r_{i\hat{v}}$ is a data rate that the virtual access point can provide to the user terminal, H is a trade-off parameter between power savings and a throughput, and $p_{\hat{v}}$ is a power consumption when the virtual access point is activated.

6. The method of claim 1, wherein the final objective function is expressed by the following equation:

$$\sum_{i\in I} q_i \left( \sum_{v\in V} r_{iv} \frac{x_{iv}}{\sum_{i\in I} x_{iv}} \right) - H \sum_{v\in V} p_v y_v$$

wherein i is the user terminal, I is a set of user terminals, v is the access point, V is a set of access points, $q_i$ is a queue of the user terminal, $r_{iv}$ is a data rate which the access point can provide to the user terminal, $x_{iv}$ is a variable that indicates whether the user terminal is to associate with the access point, $y_v$ a variable that indicates whether the access point is to be activated or deactivated, H is a trade-off parameter between power savings and a throughput, $p_v$ is a power consumption when the access point is activated.

7. The method of claim 5, wherein the virtual access point identifies a channel for establishing a network association of an access point in the Wi-Fi network.

8. A method for managing access points in a Wi-Fi network by using a centralized controller, the method comprising:
    obtaining information on a data rate for each of a plurality of virtual access points, information on a power consumption when the virtual access point is activated, and information on interference relationships between the virtual access points;
    obtaining a solution for maximizing a linear objective function by using the obtained information;
    filtering the obtained solution and resetting the obtained solution to have a single virtual access point associate with a user terminal;
    producing a first virtual access point activation reference value for determining the virtual access point to be activated, by using the reset solution, for each of the virtual access points;

updating the information on the interference relationships between the virtual access points by using the reset solution;

determining virtual access points to be deactivated, as all virtual access points under interfering relationship with the virtual access point to be activated;

determining all virtual access points under interfering relationship with the virtual access points to be activated, as virtual access points to be deactivated;

determining the virtual access point to be associated with the user terminal among the virtual access points to be activated by using the reset solution;

producing the control variables corresponding to the virtual access points to be activated, to the virtual access points to be deactivated, and to the virtual access point determined to be associated with the user terminal from among the virtual access points to be activated; and activating some of the access points based on the control variables, and associating activated access points with the user terminal by using a channel.

9. The method of claim 8, wherein the information on the interference relationships between the virtual access points comprises an interference graph wherein each of the virtual access points is a vertex and at least one intervening edge is provided between the virtual access points determined to be under interfering relationship from among the plurality of the virtual access points.

10. The method of claim 9, wherein the determining of the virtual access points to be activated comprises:

producing, for each of the plurality of the virtual access points, a second virtual access point activation reference value by dividing the first virtual access point activation reference value by 'the number of all virtual access points under interfering relationships' +1;

determining the virtual access point as to be activated when having the second virtual access point activation reference value calculated to be the largest, and determining all the virtual access points under interfering relationships as to be deactivated;

further updating the interference graph based on the virtual access point determined to be activated and the virtual access point determined to be deactivated; and activating the access point corresponding to the virtual access point to be activated, and updating a channel of an activated access point.

11. The method of claim 9, further comprising:

if there is at least one user terminal without the virtual access point determined to be associated with, selecting an arbitrary user terminal from the at least one user terminal;

calculating, for each of the plurality of the virtual access points, a virtual access point connection reference value for determining the virtual access point to be associated with the arbitrary user terminal;

determining, from among virtual access points available to be associated with the arbitrary user terminal, the virtual access point as to be activated for having the virtual access point activation reference value calculated to be the largest, unless the virtual access point is so determined;

determining virtual access points to be deactivated, as all virtual access points under interfering relationship with the virtual access point to be activated;

further updating the interference graph based on the virtual access point determined to be activated and the virtual access point determined to be deactivated; and activating the access point corresponding to the virtual access point to be activated, and updating a channel of an activated access point.

12. A method for managing access points in a Wi-Fi network by using a centralized controller, the method comprising:

obtaining information on a data rate for each of a plurality of virtual access points, information on a power consumption when the virtual access point is activated, and information on interference relationships between the virtual access points;

obtaining a solution for maximizing a linear objective function by using the obtained information;

using the obtained solution for determining the virtual access point to be activated, determining all virtual access points under interfering relationship with the virtual access point to be activated, as virtual access points to be deactivated, and determining a user terminal that cannot be associated with the virtual access point to be activated;

further determining the virtual access point to be activated based on a power consumption among the virtual access points other than the virtual access points to be deactivated and on the number of user terminals available for association from among user terminals that cannot be associated with the virtual access point to be activated;

further determining virtual access points to be deactivated, as all virtual access points under interfering relationship with the virtual access point further determined to be activated;

updating the user terminals that cannot be associated with the virtual access point to be activated, by considering the result of the further determination of virtual access point to be activated and deactivated;

modifying the information on the data rate by reflecting the virtual access point determined to be activated, obtaining a further solution for maximizing the linear objective function by using the modified information on the data rate, and setting the further obtained solution to an adjusted solution;

determining, from among the virtual access points to be activated, the virtual access point to be associated with the user terminal, by using the adjusted solution; and calculating the control variables corresponding to the virtual access points to be activated, to the virtual access points to be deactivated, and to the virtual access point determined to be associated with the user terminal from among the virtual access points to be activated, activating some of the access points based on the control variables, and associating activated access points with the user terminal by using a channel.

13. The method of claim 12, further comprising:

determining the independent virtual access point as a virtual access point to be activated if there is an independent virtual access point that belongs neither to the virtual access points to be activated nor to the virtual access points to be deactivated;

further obtaining a solution for maximizing the linear objective function by reflecting the independent virtual access point determined to be the virtual access point, and setting the solution further obtained to a readjusted solution;

setting and generating the readjusted solution as the control variable if a value of a final objective function obtained by substituting the readjusted solution is greater than a second final objective function obtained by substituting the adjusted solution; and determining the virtual access point that corresponds to the readjusted solution, as the virtual access point to be deactivated if the value of the final objective function obtained by substituting the readjusted solution is less than the second final objective function obtained by substituting the adjusted solution.

14. The method of claim 12, wherein the calculating of the control variables for managing the access points is repeatedly performed until there remains no more of the virtual access points, that belongs neither to the virtual access points to be activated nor to the virtual access points to be deactivated.

15. A non-transitory computer readable medium storing a computer program including computer-executable instructions for causing, when executed in a processor, the processor to perform steps comprising:

obtaining information on a data rate for each of the access points in a Wi-Fi network, information on a power consumption when the access point is activated, and information on interference relationships between the access points;

calculating one or more control variables for indicating the access point to be activated, a channel for use in associating the access point to be activated with a user terminal, and the user terminal to be associated with the access point to be activated, by using the obtained information; and activating, some of the access points based on the control variables, and associating activated access points with the user terminal by using the channel, wherein the calculating the control variables comprises:

obtaining a solution for maximizing a linear objective function which takes, as parameters, a variable representing whether the access point is activated or deactivated and another variable representing which of the access points to be activated is to be associated by the user terminal;

producing a first candidate control variable and a second candidate control variable which, represent candidates for the control variables, by using the obtained solution;

comparing a final objective function obtained by substituting the first candidate control variable with a second final objective function obtained by substituting the second candidate control variable;

generating the first candidate control variable as the control variable if a value of the final objective function obtained by substituting the first candidate control variable is compared to be greater than the second final objective function obtained by substituting the second candidate control variable; and generating the second candidate control variable as the control variable if the value of the final objective function obtained by substituting the first candidate control variable is compared to be less than the second final objective function obtained by substituting the second candidate control variable.

16. A centralized controller for managing access points, the centralized controller comprising at least one processor to implement:

an input unit configured to obtain information on a data rate for each of the access points included in a Wi-Fi network, information on a power consumption when the access point is activated, and information on interference relationships between the access points;

a control variable calculation unit configured to produce one or more control variables representing an access point to be activated, a channel for use in associating the access point to be activated with a user terminal, and the user terminal to be associated with the access point to be activated, by using the obtained information; and a controlling unit configured to activate some of the access points based on the control variables, and associating activated access points with the user terminal by using the channel;

wherein the producing the control variables comprises:

obtaining a solution for maximizing a linear objective function which takes, as parameters, a variable representing whether the access point is activated or deactivated and another variable representing which of the access points to be activated is to be associated by the user terminal;

producing a first candidate control variable and a second candidate control variable which, represent candidates for the control variables by using the obtained solution;

comparing a final objective function obtained substituting the first candidate control variable with a second final objective function obtained by substituting the second candidate control variable;

generating the first candidate control variable as the control variable if a value of the final objective function obtained by substituting the first candidate control variable is compared to be greater than the second final objective function obtained by substituting the second candidate control variable; and generating the second candidate control variable as the control variable if the value of the final objective function obtained by substituting the first candidate control variable is compared to be less than the second final objective function obtained by substituting the second candidate control variable.

* * * * *